United States Patent [19]

Kluger

[11] 4,362,894
[45] Dec. 7, 1982

[54] POLY-(-2-AMINOALKYL)POLYAMINES

[75] Inventor: Edward W. Kluger, Pauline, S.C.

[73] Assignee: Milliken Research Corporation, Spartanburg, S.C.

[21] Appl. No.: 260,148

[22] Filed: May 4, 1981

[51] Int. Cl.$^3$ .................. C07C 87/20; C08G 59/50
[52] U.S. Cl. ................................. 564/512; 528/123
[58] Field of Search ................... 564/512; 528/123

[56] References Cited

U.S. PATENT DOCUMENTS

| | | | |
|---|---|---|---|
| 2,520,104 | 8/1950 | Bahner | 564/512 X |
| 3,236,835 | 2/1966 | Rabourn | 564/512 X |
| 3,246,000 | 4/1966 | Baizer | 564/512 X |
| 3,401,156 | 9/1968 | Lovett et al. | 564/512 X |
| 4,195,155 | 3/1980 | Drake et al. | 564/512 X |

FOREIGN PATENT DOCUMENTS

| | | | |
|---|---|---|---|
| 711654 | 7/1954 | United Kingdom | 564/512 |
| 906234 | 9/1962 | United Kingdom | 564/512 |

Primary Examiner—John Doll
Attorney, Agent, or Firm—H. William Petry; Terry T. Moyer

[57] ABSTRACT

Poly-(-2-aminoalkyl)polyamine compounds are provided having the following formula:

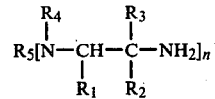

wherein:
n is an integer of from 3 to about 12;
$R_1$ is selected from H and an alkyl group containing from 1 to about 10 carbon atoms;
$R_2$ and $R_3$ are each independently selected from H and a lower alkyl group containing from 1 to about 6 carbon atoms;
$R_4$ is selected from H and

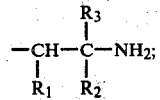

and
$R_5$ is selected from an alkyl group containing from about 6 to about 25 carbon atoms.

9 Claims, No Drawings

POLY-(-2-AMINOALKYL)POLYAMINES

The present invention relates to poly-(-2-aminoalkyl)-polyamine compounds, and to methods for curing epoxy resins wherein poly-(-2-aminoalkyl)polyamine compounds are employed as a curing agent. The present invention also relates to epoxy resin compositions containing poly-(-2-aminoalkyl)polyamine compounds as epoxy curing agents.

Epoxy resins were first introduced commercially in the United States in about 1950 and since then their use has grown rapidly. Epoxy resins may be broadly defined as resinous intermediate materials which are characterized by the presence of the epoxy group

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides, tertiary amines, and amine adducts. The novel poly-(2-aminoalkyl)polyamine compounds of the present invention may be employed as the third type, namely the amine type, of epoxy curing agent.

The poly-(-2-aminoalkyl)polyamine comounds of the present invention may be represented by the following structural formula:

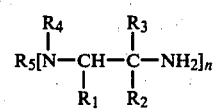

wherein:
n is an integer of from 3 to about 12;
$R_1$ is selected from H and an alkyl group containing from 1 to about 10 carbon atoms;
$R_2$ and $R_3$ are each independently selected from H and a lower alkyl group containing from 1 to about 6 carbon atoms;
$R_4$ is selected from H and

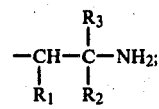

and
$R_5$ is selected from an alkyl group containing from about 6 to about 25 carbon atoms.

The present invention also relates to the use of such compounds as epoxy curing agents and to epoxy resin compositions which contain 100 parts by weight of at least one epoxy resin and from about 15 parts to about 50 parts, preferably about 20 parts to about 30 parts by weight, of the poly-(2-aminoalkyl)polyamine compounds of the invention. Such cured products have good flexiblity, high heat distortion temperatures, and excellent solvent resistance.

The compounds of the present inventions may be conveniently prepared in a two-step process. In a first step, an intermediate, poly-(-2-nitroalkyl)polyamine, may be prepared by a condensation reaction of the nitroparaffin with an aldehyde such as formaldehyde and a suitable polyamine according to the following generalized reaction:

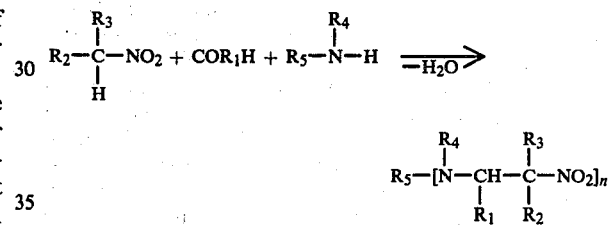

where $R_1$, $R_2$, $R_3$, $R_4$, $R_5$, and n have the values given above.

The nitroparaffin employed as a starting material preferably may be a compound of the formula

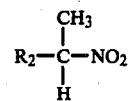

wherein $R_2$ is H or aliphatic groups containing from about 1 to about 9 carbon atoms.

Some commonly available useful nitroparaffins are nitromethane, nitroethane, 1-nitropropane, 2-nitropropane, and high-order nitroparaffins containing up to about 10 carbon atoms. Particularly good results may be obtained using 2-nitropropane, which is preferred.

The polyamines which may be employed as a starting material in the above reaction may be selected from a wide range of compounds, although a preferred class of such compounds is those having the general structure

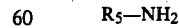

wherein $R_5$ has the value set forth above. A particularly useful polyamine is one having the formula

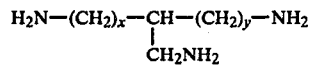

where x and y are independently selected from integers of from 1 to about 6, preferably 2 to 5. Most preferably x is 3 and y is 4.

According to an alternative embodiment, rather than preparing the poly-(-2-nitroalkyl)polyamine by the above-described in situ reaction of the nitroparaffin, aldehyde, and polyamine, the poly-(2-nitroalkyl)polyamines may be prepared in a two-step process by first reacting the aldehyde with the nitroparaffin and then reacting the corresponding nitroalcohol with the polyamine in a separate reaction according to the following sequence:

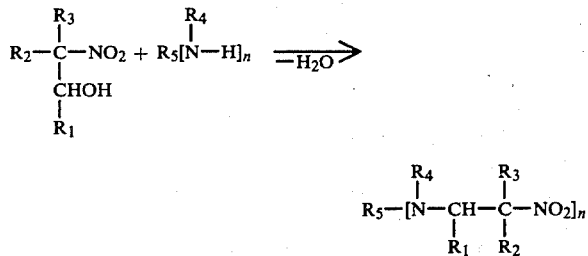

where $R_1$, $R_2$, $R_3$, $R_4$, $R_5$, and n have the values set forth above.

The reaction of nitro-paraffin, formaldehyde, and polyamine may be carried out at a temperature of from about 20° C. to the boiling point of the mixture. The preferred temperature is from about 75° C. to about 120° C. The use of a solvent is not critical in the preparation of poly-(2-nitroalkyl)polyamines; however, the use of a mutual solvent provides a homogeneity for all the reactants and facilitates mixing. Lower alcohols, such as methyl alcohol, ethyl alchol, and isopropyl alcohol, are preferred. At least stoichiometric amounts of 2-nitropropane, aldehyde, and polyamine may be used. Excess aldehyde and polyamine may be used without adverse effects.

The preferred molar ratio is about an equivalent number of moles of nitroparaffin and aldehyde which is equal to the number of primary amino nitrogens in the polyamine or the preferred moles of nitroalcohol used is equal to the number of primary amine nitrogens in the polyamine.

The crude poly-(2-nitroalkyl)polyamine may then be isolated by any convenient means as, for instance, by solvent extraction and may then be reduced to the poly-(-2-aminoalkyl)-polyamine compound with hydrogen and a suitable metal catalyst according to the following equation:

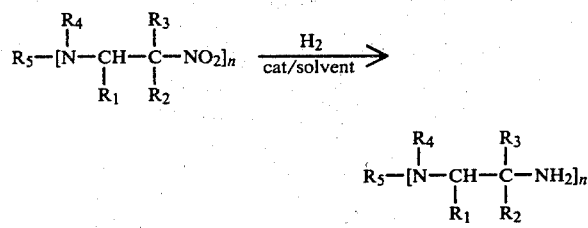

wherein $R_1$, $R_2$, $R_3$, $R_4$, $R_5$, and n are defined above.

The poly-(-2-aminoalkyl)polyamine(s) were prepared by passing hydrogen through a catalyst-containing solution of poly-(-2-nitroalkyl)polyamine in suitable solvent. Solvents include lower weight alcohols such as methyl alcohol, ethyl alcohol, and isopropyl alcohol; ethers such as dioxane; hydrocarbons such as benzene, toluene, xylenes, cyclohexane, and petroleum ether; and mixtures of lower weight alcohols and water such as about equal parts by weight of ethyl alcohol and water. The amount of solvent is not critical. The preferred solvent is methyl alcohol in an amount of about 30 percent to about 80 percent by weight.

Any suitable reduction catalyst may be used to catalyze the reduction of the poly-(-2-nitroalkyl)polyamine to the poly-(-2-aminoalkyl)polyamine compound. Catalysts such as Raney nickel; nickel oxides; finely divided metals such as iron, cobalt, platinum, ruthenium, osmium, and rhodium may be used. Furthermore, metal catalysts supported on pumice, asbestos, kieselkuhr, alumina, silica gel, or charcoal work equally as well. The amount of catalysts used depends on such reaction variables as temperature, pressure, and time, and it can vary from about 0.025 percent to about 15 percent by weight of the poly-(-2-nitroalkyl)polyaine. The preferred catalyst is Raney nickel or supported nickel present from about 0.1 percent to about 15 percent by weight of the poly-(-2-nitroalkyl)polyamine. The poly-(-2-nitroalkyl)polyamine may be reduced at a temperature of from about 20° C. to about 120° C., although temperatures of from about 40° C. to about 75° C. may be preferred since they may provide faster reaction times and higher yields of poly-(-2-aminoalkyl)polyamines. During the reduction of poly-(-2-nitroalkyl)polyamine, pressures ranging from about 100 to 3,000 psi, preferably from about 500 to 1,500 psi, of hydrogen may be used.

The process of reducing the poly-(-2-nitroalkyl)polyamines has been described as a batch operation carried out in a high-pressure stirred autoclave; however, other reducing modes may give equally good results. A continuous flow reactor may be used with suspended- or fixed-bed solid catalysts operating at the proper temperature, pressure, and flowrate to give the desired reduction. Most preferably, the desired reduction may be accomplished by incremental addition of the poly-(-2-nitroalkyl)polyamine to a batch-type reactor at the proper described operating conditions.

Substantially pure, low molecular weight polyamines can be separated from the reaction mixture by filtration of the catalyst and insoluble material, distilling off the solvent and thereafter distilling the residue under reduced pressure. Where higher molecular weight polyamines are prepared and where mixtures of non-stoichiometric reaction ratios were used, the resulting products may be more difficult to purify. Therefore, these products may generally be used as obtained without any adverse effects. Reaction product(s) were characterized by GC-mass spectra, IR, proton NMR, Carbon-13 NMR, and elemental analysis.

One particularly important use for the novel compounds of the present invention is their use as epoxy curing agents for polyepoxides. The polyepoxides which can be cured at elevated temperatures using the amino compounds as herein described are those polyepoxides possessing at least two

groups. These groups may be terminal, i.e.,

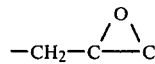

groups, or they may be in an internal position; however, especially desirable results can be obtained when the epoxy groups are terminal. The polyepoxides may be saturated or unsaturated, aliphatic, cycloaliphatic, aromatic, or heterocyclic, and may be substituted such as with hydroxyl groups, ether radicals, and the like. Further, the polyepoxides can be monomeric or polymeric. Such polyepoxides, and their preparation, are well known in the art.

The curing of the polyepoxides with the above-described polyamine curing agents of the present invention may be accomplished by simply mixing the two components together. While the reaction between the two components may occur slowly at room temperature, improved results can be obtained if the mixture is heated to a temperature of from about 50° C. to about 180° C. for a period of time of from about 1 to about 12 hours and thereafter post-curing the reaction product for an additional period of time from about 1 to about 8 hours at a temperature of from about 140° C. to about 225° C. With a small casting, curing the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides, it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel polyamine curing agent by evaporation before and/or during the curing of such polyepoxide composition can be added to the polyepoxide to reduce its viscosity. Typical of such volatile liquid solvents are ketones, such as acetone, methyl ethyl ketone, and the like; ethers, such as ethyl acetate, butyl acetate, and the like; ether alcohols, such as methyl, ethyl, or butyl ethers of ethylene glycol; and chlorinated hydrocarbons, such as chloroform.

In addition to the use of the polyamine compounds of the present invention as epoxy curing agents, many other uses can readily be envisioned by those skilled in the art. Thus, not only do the compounds of the present invention find utility as epoxy curing agents but such compositions can be employed as oil and fuel adductive intermediates. Further, the polyamimes may be employed for the formation of diisocyanate compositions for the incorporation into polyurethane compositions, and the compound may be further reacted to form novel and useful polyamides.

In order to more fully describe the preparation and use of the novel compounds of the present invention, the following examples are given; however, such examples are presented for illustration only and are not to be construed as unduly limiting the scope of the present invention. Unless otherwise indicated, all parts and/or percentages given in these examples are by weight.

EXAMPLE 1

In a 1,000 cc three-necked flask equipped with a magnetic stir bar, thermometer, dropping funnel, reflux condenser with a Dean-Stark collector, and heating mantle were placed 115.3 gm (0.97 mole) of 2-nitro-2-methyl-1-propanol, 150 ml of toluene, 10 cc of 2-nitropropane, and 167.8 g (0.97 mole) of 4-aminomethyl-1,8-octanediamine. This mixture was then heated to reflux and 17.5 ml of water distilled over n the Dean-Stark trap during the course of several hours. The reaction mixture was allowed to relux until no water distilled over, indicating that reaction was complete. On cooling, the toluene and unreacted starting materials were then distilled away from the product under vacuum (15–20 mm Hg) to give a viscous pale orange product. A yield of 268.2 g, or 100% of the crude poly-(-2-nitro-2-methylpropyl)-4-aminomethyl-1,8-octane diamine was obtained. An IR spectrum of the product indicated that nitro groups were present. The product was used without further purification.

EXAMPLE 2

In a 1,000 cc three-necked flask equipped with a magnetic stir bar, thermometer, dropping funnel, reflux condenser with a Dean-Stark collector, and heating mantle were placed 238.8 (2 moles) of 2-nitro-2-methyl-1-propanol, 250 ml of toluene, 20 cc of 2-nitropropane, and 173.3 g (1.0 mole) of 4-aminomethyl-1,8-octanediamine. This mixture was then heated to reflux and 38 ml of water distilled over in the Dean Stark trap during the course of three hours. The reaction mixture was allowed to reflux until no water distilled over, indicating that the reaction was complete. On cooling, the toluene and unreacted starting materials were then distilled away from the product under vacuum (15–20 mg) to give a viscous pale orange product. A yield of 378.6 gm, or 100% of the poly-(-2-nitro-2-methylpropyl)-4-aminomethyl-1,4-octanediamine, was obtained. An IR spectrum of product indicated that nitro groups were present. The product was used without further purification.

EXAMPLE 3

In a 2,000 cc three-necked flask equipped with a magnetic stir bar, thermometer, Dean-Stark trap collector, and heating mantle were placed 357.3 g (3 moles) of 2-nitro-2-methyl-1-propanol, 250 ml of toluene, 20 cc of 2-nitropropane, and 173.3 g (1 mole) of 4-aminomethyl-1,8-octane-diamine. This mixture was then heated to reflux and 54 ml of water distilled over in the Dean-Stark trap during the course of several hours. The reaction mixture was allowed to reflux with no water distilling over, indicating that the reaction was complete. On cooling, the toluene and unreacted starting materials were then distilled away from the product under vacuum (15–20 mm Hg) to give a viscous pale orange product. A yield of 500.1 gm, or 100% of the crude poly-(-2-nitro-2-methylpropyl)-4-aminomethyl-1,8-octanediamine, was obtained. An IR spectrum of the product indicated that nitro groups were present. The product was used without any further purification.

EXAMPLE 4

In a 2,000 cc three-necked flask equipped with a mechanical stirrer, thermometer, Dean-Stark trap collector, and heating mantle were placed 174 gm (6 moles) of 2-nitro-2-methyl-1-propanol, 1,000 cc of toluene, and 173.3 g (1 mole) of 4-aminomethyl-1,8-octanediamine. This mixture was then heated to reflux and 104 ml of water distilled over in the Dean-Stark trap during the course of several hours. The reaction mixture was allowed to reflux until no water distilled over, indicating that the reaction was complete. On cooling, the toluene and unreacted starting materials were then distilled away from the product under vacuum (15–20 mm Hg) to give a dark brown very viscous product. A yield of 714.4 gm, or 91.7%, of the crude poly-(-2-nitro-2-methylpropyl)-4-aminomethyl-1,8-octanediamine was IR spectrum of the product indicated that all the nitro groups had been reduced. This product was used without further purification.

EXAMPLE 8

To 4 beakers, each containing 100 parts of epoxy resin based on diglycidyl ether of bisphenol A (n=0.2, WPE=185-195), having the formula:

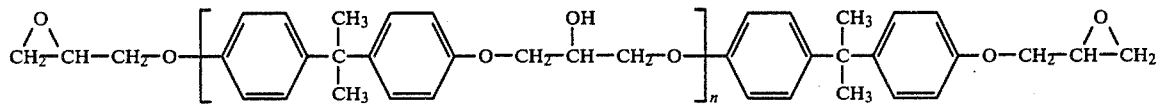

obtained. An IR spectrum of the product indicated that nitro groups were present. The product was used without further purification.

EXAMPLE 5

In a 2,000 cc stirred autoclave were charged 148 gm of crude poly-(-2-nitro-2-methylpropyl)polyamine from Example 2, 200 cc of methyl alcohol, and 7.0 gm of Raney nickel catalyst. The autoclave was sealed and pressured with hydrogen gas. The reduction of the poly-(-2-nitro-2-methylpropyl)polyamine was conducted at 40°–100° C. and 1,000–1,600 psi hydrogen pressure until the hydrogen absorption was complete. On cooling, the reaction mixture was filtered from the catalyst and the methyl alcohol and any volatiles were removed under vacuum to give a pale yellow liquid product. An IR spectrum of the product indicated that all the nitro groups had been reduced. The crude product was further fractioned at 5.5 mm Hg (200°–230° C.) to give colorless liquids of varying 2-amino-2-methylpropyl substitution, with the major components being the di- and trisubstituted products.

EXAMPLE 6

In a 2,000 cc stirred autoclave were charged 150 gm of crude poly-(-2-nitro-2-methylpropyl)polyamine from Example 3, 200 cc of methyl alcohol, and 7.0 gm of Raney nickel catalyst. The autoclave was sealed and pressured with hydrogen gas. The reduction of the poly-(-2-nitro-2-methylpropyl)polyamine was conducted at 40°–100° C. and 1,000–1,600 psi hydrogen pressure until the hydrogen absorption was complete. On cooling, the reaction mixture was filtered from the catalyst and the methyl alcohol and any volatiles were removed under vacuum to give a pale yellow liquid product. An IR spectrum of the product indicated that all the nitro groups bad been reduced. The crude product was further fractionated at 160°–200° C. and 5.0–5.5 mm Hg to give colorless liquids of varying 2-amino-2-methylpropyl substitution, with the major component being the trisubstituted product.

EXAMPLE 7

In a 2,000 cc stirred autoclave were charged 150 gm of crude poly-(-2-nitro-2-methylpropyl)polyamine of Example 1, 200 cc of methyl alcohol, and 7.0 gm of Raney nickel catalyst. The autoclave was sealed and pressured with hydrogen gas. The reduction of the poly-(-2-nitro-2-methylpropyl)polyamine was conducted at 40°–100° C. and 900–1,500 psi of hydrogen pressure until the hydrogen absorption was complete. On cooling, the reaction mixture was filtered from the catalyst and the methyl alcohol and any volatiles were removed under vacuum to give a colorless liquid. An were added the corresponding parts of 4-aminomethyl-1,8-octanediamine: 14.0 parts, 15.0 parts, 16.0 parts, and 17.0 parts. After mixing each beaker thoroughly for 2 minutes and centrifuging at a speed of 3,000 rpm, these resin mixtures were placed in an aluminum mold and were cured for 2 hours at 80° C. and for another 2 hours at 150° C. The crosslinked products had glass transition temperatures measured with a differential scannng calorimeter (Perkin Elmer Model DSC-2) as are summarized in the Table below.

TABLE 1

| GLASS TRANSITION TEMPERATURE FOR 4-AMINOMETHYL-1,8-OCTANEDIAMINE | | |
|---|---|---|
| ENTRY | PHR | Tg (°C.) |
| 1 | 14.0 | 138.6 |
| 2 | 15.0 | 145.1 |
| 3 | 16.0 | 140.1 |
| 4 | 17.0 | 128.1 |

EXAMPLE 9

A 5 PHR study was done with fractionated poly-(-2-amino-2-methylpropyl)polyamines from both Examples 5 and 6 with diglycidyl ether of bisphenol A (n=0.2, WPE=185-195). After mixing each sample thoroughly for 2 minutes and centrifuging at a speed of 3,000 rpm, these resin mixtures were placed in an aluminum mold and wee cured for 2 hours at 80° C. The crosslinked products had maximum glass transition temperatures measured with a differential scanning calorimeter (Perkin Elmer Model DSC-2) as are summarized in Table 2 below. The percent weight (by GLC) of mono-, di-, and tri-substituted 2-amino-2-methylpropyl is also included, as well as the 4-amino-methyl-1,8-octanediamine starting material for comparison.

TABLE 2

| GLASS TRANSITION TEMPERATURE FOR POLYAMINE CURING AGENTS | | | | | |
|---|---|---|---|---|---|
| ENTRY | CURING AGENT | PHR | % MONO | % DI | % TRI | Tg (°C.) |
| 1 | 4-aminomethyl-octanediamine | 17.0 | — | — | — | 145.1 |
| 2 | Example 5 | 21.0 | 20.0 | 60.0 | 20.0 | 151.3 |
| 3 | Example 6 | 23.0 | 10.0 | 24.0 | 66.0 | 156.6 |

The above examples clearly show the preparation of the novel compound(s) of the present invention. Furthermore, Examples 8 and 9 demonstrate the use of poly-(-2-aminoalkyl)polyamines as epoxy curing agents. In addition to the prolonged pot life observed for these novel poly-(-2-aminoalkyl)polyamines, enhanced thermal properties were also observed over the corresponding aliphatic counterparts. Table 2, Entry 3 clearly shows a glass transition temperature about 12° C. higher for the poly-(-2-aminoalkyl)polyamine.

What is claimed is:

1. Poly-(-2'-aminoalkyl)polyamine compounds of the formula:

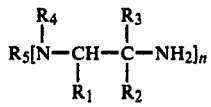

wherein:
- n is an integer of from 3 to about 12;
- $R_1$ is selected from H and an alkyl group containing from 1 to about 10 carbon atoms;
- $R_2$ and $R_3$ are each independently selected from H and a lower alkyl group containing from 1 to about 6 carbon atoms;
- $R_4$ is selected from H and

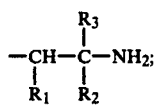

and
- $R_5$ is an alkyl group containing from about 6 to about 25 carbon atoms.

2. The polyamines of claim 1, wherein $R_2$ and $R_3$ are $CH_3$.

3. The polyamines of claim 2, wherein $R_1$ is H.

4. The polyamines of claim 3, wherein $R_4$ is H.

5. The polyamine compounds of claim 1 where said alkyl group of said $R_5$ moiety is derived from an amine compound of the formula:

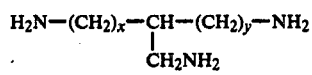

where x and y are independently selected from integers of from 1 to about 6, wherein the functionality of said compounds is provided by the reaction of at least one of the primary amine groups thereof.

6. Poly-(-2-nitroalkyl)polyamine compounds of the formula

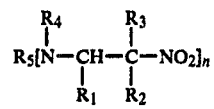

wherein:
- n is an integer of from 3 to about 12;
- $R_1$ is selected from H and an alkyl group containing from 1 to about 10 carbon atoms;
- $R_2$ and $R_3$ are each independently selected from H and a lower alkyl group containing from 1 to about 6 carbon atoms;
- $R_4$ is selected from H and

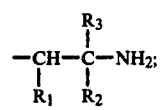

and
- $R_5$ is selected from an alkyl group containing from about 6 to about 25 carbon atoms.

7. The compounds of claim 6, wherein $R_2$ and $R_3$ are $CH_3$.

8. The compounds of claim 7, wherein $R_4$ is H.

9. The compounds of claim 6, wherein said alkyl group of said $R_5$ moiety is derived from an amine compound of the formula:

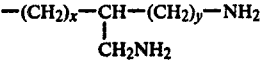

where x and y are independently selected from integers of from 1 to about 6, wherein the functionality of said compound is provided by the reaction of at least one of the primary amine groups thereof.

* * * * *

UNITED STATES PATENT AND TRADEMARK OFFICE
CERTIFICATE OF CORRECTION

PATENT NO. : 4,362,894

DATED : December 7, 1982

INVENTOR(S) : Edward W. Kluger

It is certified that error appears in the above-identified patent and that said Letters Patent is hereby corrected as shown below:

Column 1, line 34, after word "that" add --in--.

Column 1, line 51, change "comounds" to --compounds--.

Column 3, line 6, change "in situ" to --*in situ*--.

Column 3, line 32, change "poly-(2-nitroalkyl)polyamines" to --poly-(-2-nitroalkyl)polyamines--.

Column 3, line 45, change "poly-(2-nitroalkyl)polyamine" to --poly-(-2-nitroalkyl)polyamine--.

Column 3, line 49, change "(-2-aminoalkyl)-polyamine" to --(-2-aminoalkyl)polyamine--.

Column 6, line 10, change "unereacted" to --unreacted--.

UNITED STATES PATENT AND TRADEMARK OFFICE
CERTIFICATE OF CORRECTION

PATENT NO. : 4,362,894

DATED : December 7, 1982

INVENTOR(S) : Edward W. Kluger

It is certified that error appears in the above-identified patent and that said Letters Patent is hereby corrected as shown below:

Column 6, line 64, change "174" to --714--.

Column 8, line 44, change "wee" to --were--.

Signed and Sealed this

Thirtieth Day of September 1986

[SEAL]

Attest:

DONALD J. QUIGG

Attesting Officer

Commissioner of Patents and Trademarks